(12) United States Patent
Sahoo

(10) Patent No.: US 10,814,603 B2
(45) Date of Patent: Oct. 27, 2020

(54) METHODS FOR PROCESSING A FIRST SUBSTRATE BONDED TO A SECOND SUBSTRATE

(71) Applicant: CORNING INCORPORATED, Corning, NY (US)

(72) Inventor: Leena Kumari Sahoo, Corning, NY (US)

(73) Assignee: Corning Incorporated, Corning, NY (US)

( * ) Notice: Subject to any disclaimer, the term of this patent is extended or adjusted under 35 U.S.C. 154(b) by 46 days.

(21) Appl. No.: 15/772,372

(22) PCT Filed: Oct. 27, 2016

(86) PCT No.: PCT/US2016/059014
§ 371 (c)(1),
(2) Date: Apr. 30, 2018

(87) PCT Pub. No.: WO2017/075151
PCT Pub. Date: May 4, 2017

(65) Prior Publication Data
US 2018/0354251 A1     Dec. 13, 2018

Related U.S. Application Data

(60) Provisional application No. 62/248,823, filed on Oct. 30, 2015.

(51) Int. Cl.
*B32B 43/00* (2006.01)
*B32B 38/10* (2006.01)

(52) U.S. Cl.
CPC ............ *B32B 43/006* (2013.01); *B32B 38/10* (2013.01); *B32B 2457/20* (2013.01);
(Continued)

(58) Field of Classification Search
CPC . B32B 38/10; B32B 43/006; Y10T 156/1184; Y10T 156/1961; Y10T 156/1967
(Continued)

(56) References Cited

U.S. PATENT DOCUMENTS 7,150,804 B2 * 12/2006 Tajima ...................... G09F 7/18
156/718
8,118,075 B2 * 2/2012 Sampica ................ B26D 1/547
156/711
(Continued)

FOREIGN PATENT DOCUMENTS

JP   2001210998 A   8/2001
JP   2014118276 A   6/2014
(Continued)

OTHER PUBLICATIONS

International Search Report and Written Opinion of the International Searching Authority; PCT/US2016/059014; dated Jan. 20, 2017; 12 Pages; Korean Patent Office.

*Primary Examiner* — Mark A Osele
*Assistant Examiner* — Nickolas R Harm
(74) *Attorney, Agent, or Firm* — Jeffrey A. Schmidt

(57) ABSTRACT

Methods of processing a first substrate bonded to a second substrate include moving a wire along an interface to propagate a debonding front and debond the first substrate from the second substrate. In some embodiments, the first substrate includes a thickness less than or equal to about 300 µm. In further embodiments, the wire includes a tensile strength less than a critical failure stress of the first substrate. In still further embodiments, the wire is configured to conform to a shape of the debonding front during the step of moving the wire such that one or more edges of the first substrate are debonded from the second substrate prior to a
(Continued)

debonding of a corresponding interior portion of the first substrate from the second substrate.

22 Claims, 3 Drawing Sheets

(52) U.S. Cl.
CPC .... *Y10T 156/1184* (2015.01); *Y10T 156/1961* (2015.01); *Y10T 156/1967* (2015.01)

(58) Field of Classification Search
USPC .......................................... 156/717, 761, 762
See application file for complete search history.

(56) References Cited

U.S. PATENT DOCUMENTS

| | | | | |
|---|---|---|---|---|
| 8,141,611 B2* | 3/2012 | Lai | ......................... | B23D 49/02 |
| | | | | 156/701 |
| 8,152,947 B2* | 4/2012 | Toyoda | ................. | G02F 1/1333 |
| | | | | 156/247 |
| 8,349,129 B2* | 1/2013 | Blanchard | ............. | B32B 43/006 |
| | | | | 156/707 |
| 8,419,896 B2* | 4/2013 | Ciliberti | ................ | G02F 1/1303 |
| | | | | 156/703 |
| 8,888,953 B2* | 11/2014 | Teck | ......................... | B26D 3/28 |
| | | | | 156/703 |
| 9,182,625 B2* | 11/2015 | Watanabe | ......... | G02F 1/133502 |
| 9,254,636 B2* | 2/2016 | Price | ..................... | B32B 43/006 |
| 9,338,893 B2 | 5/2016 | Huang et al. | | |
| 9,517,615 B2* | 12/2016 | Dong | ....................... | B26D 3/28 |
| 9,568,754 B2* | 2/2017 | Park | ....................... | G02F 1/1303 |
| 10,052,777 B2* | 8/2018 | Zhan | ....................... | B26D 1/547 |
| 2008/0308231 A1 | 12/2008 | Lee et al. | | |
| 2010/0199818 A1* | 8/2010 | Lee | ......................... | B26D 1/547 |
| | | | | 83/16 |
| 2011/0308739 A1 | 12/2011 | McCutcheon et al. | | |
| 2012/0138237 A1 | 6/2012 | Hirano | | |
| 2014/0106141 A1 | 4/2014 | Bellman et al. | | |
| 2014/0166199 A1 | 6/2014 | Bellman et al. | | |
| 2014/0196854 A1 | 7/2014 | Lee et al. | | |
| 2015/0290921 A1 | 10/2015 | Kim et al. | | |
| 2015/0329415 A1 | 11/2015 | Bellman et al. | | |
| 2016/0031106 A1* | 2/2016 | Wu | ......................... | B26D 3/28 |
| | | | | 83/15 |
| 2017/0036419 A1 | 2/2017 | Adib et al. | | |
| 2018/0126705 A1 | 5/2018 | Adib et al. | | |

FOREIGN PATENT DOCUMENTS

| | | |
|---|---|---|
| JP | 2014141344 A | 8/2014 |
| WO | 2015012261 A1 | 1/2015 |
| WO | 2015113020 A1 | 7/2015 |
| WO | 2015113023 A1 | 7/2015 |
| WO | 2016209897 A1 | 12/2016 |

* cited by examiner

METHODS FOR PROCESSING A FIRST SUBSTRATE BONDED TO A SECOND SUBSTRATE

CROSS-REFERENCE TO RELATED APPLICATIONS

This application claims the benefit of priority under 35 U.S.C. § 371 of International Patent Application Ser. No. PCT/US16/59014, filed on Oct. 27, 2016, which in turn, claims the benefit of priority of U.S. Provisional Patent Application Ser. No. 62/248,823 filed on Oct. 30, 2015, the contents of each of which are relied upon and incorporated herein by reference in their entireties.

FIELD

The present disclosure relates generally to methods for processing a first substrate bonded to a second substrate and, more particularly, to methods for debonding a first substrate from a second substrate.

BACKGROUND

Glass substrates are commonly used, for example, in display applications, including liquid crystal displays (LCDs), electrophoretic displays (EPD), organic light emitting diode displays (OLEDs), plasma display panels (PDPs), or the like. Such glass substrates are commonly fabricated from a glass ribbon drawn from a quantity of molten material using a wide variety of glass ribbon forming techniques (e.g., slot draw, float, down-draw, fusion down-draw, and up-draw). The glass substrate may be bonded to a second substrate (e.g., a carrier substrate) to facilitate handling of the glass substrate when processing the glass substrate. Once processing of the glass substrate is complete, the glass substrate can be debonded from the second substrate. However, some conventional debonding techniques can be difficult, time consuming and may even result in damage to the glass substrate. Indeed, typical debonding techniques may result in failure of the glass substrate (e.g., breaking of the glass substrate), cracking of the glass substrate, and/or introduction of edge imperfections that reduce the strength of the glass substrate.

SUMMARY

There are set forth methods and apparatus for debonding a first substrate from a second substrate. In some examples, the present disclosure provides debonding of the first substrate from the second substrate with a thin pliable wire that reduces flexing of the first substrate during debonding. As the bending of the first substrate is reduced during debonding, relatively less bending stress is introduced to the first substrate during the debonding process. Furthermore, the flexibility of the wire can allow the wire to conform to the debonding front, thus relieving stress that might otherwise develop due to interaction with sharp transitions that may occur because of glass flaws. Consequently, the debonding techniques of the present disclosure provides a technical benefit of debonding the first substrate from the second substrate with reduced chance of damaging the glass substrate (e.g., by cracking, breaking, etc.) when compared to other conventional debonding techniques. As used herein a "glass substrate" may comprise glass, glass-ceramic, ceramic, or silicon wafer.

In a first embodiment, a method of processing a first substrate bonded to a second substrate includes initiating an opening at an interface between the first substrate and the second substrate, inserting a wire into the opening, and moving the wire along the interface to propagate a debonding front and debond the first substrate from the second substrate. In one example of the first embodiment, the first substrate includes a thickness less than or equal to about 300 μm. In another example of the first embodiment, the wire includes a diameter from about 50 μm to about 300 μm. In still another example of the first embodiment, the wire includes a tensile strength from about 25 MPa to about 10 GPa. In yet another example of the first embodiment, the wire is pliable. For instance, the pliable wire can include at least one of polytetrafluoroethylene (PTFE), nylon, and fluorocarbon. In a further example of the first embodiment, the method further includes maintaining at least a minimum separation distance between a debonded portion of the first substrate and a corresponding portion of the second substrate. In one example, the minimum separation distance is greater than or equal to a diameter of the wire. In another example, the minimum separation distance is maintained over an entire debonded length of the first substrate. In still a further example of the first embodiment, the wire includes a first tensile strength less than a critical failure stress of the first substrate. In one example, the method further comprises the steps of removing the wire and inserting a new wire between the first substrate and the second substrate. In such an example, the method further includes the step of moving the new wire along the interface to further propagate the debonding front and further debond the first substrate from the second substrate, wherein the new wire includes a second tensile strength greater than the first tensile strength and less than the critical failure stress of the first substrate. The first embodiment may be provided alone or in combination with any one or more of the examples of the first embodiment discussed above.

In a second embodiment, a method of processing a first substrate bonded to a second substrate includes moving a wire along an interface between the first substrate and the second substrate to propagate a debonding front and debond the first substrate from the second substrate. The first substrate includes a thickness less than or equal to about 300 μm, and wherein the wire includes a tensile strength less than a critical failure stress of the first substrate. In one example of the second embodiment, the method further includes maintaining a debond angle substantially constant during the step of moving the wire. In another example of the second embodiment, prior to the step of moving the wire, the method includes increasing a bond strength between the first substrate and the second substrate by raising the temperature of the first substrate and the second substrate to a temperature of at least about 150° C. In still another example of the second embodiment, prior to the step of moving the wire, the method includes applying functional components to a major surface of the first substrate facing away from the second substrate bonded to the first substrate. In yet another example of the second embodiment, the step of moving the wire entirely debonds the first substrate from the second substrate. The second embodiment may be provided alone or in combination with any one or more of the examples of the second embodiment discussed above.

In a third embodiment, a method of processing a first substrate bonded to a second substrate includes initiating an opening at an interface between the first substrate and the second substrate. The method further includes the steps of inserting a wire into the opening and moving the wire along the interface to propagate a debonding front and debond the first substrate from the second substrate. The wire is configured to conform to a shape of the debonding front during the step of moving the wire such that one or more edges of the first substrate are debonded from the second substrate prior to a debonding of a corresponding interior portion of the first substrate from the second substrate. In one example of the third embodiment, the shape of the debonding front is concave with respect to a direction of propagation of the debonding front. In another example of the third embodiment, the wire is configured to at least one of yield and fail prior to a failure of the first substrate. In still another example of the third embodiment, a bond strength at the debonding front is defined based, at least in part, on at least one of a wafer bonding between the first substrate and the second substrate and a bonding agent between the first substrate and the second substrate. The third embodiment may be provided alone or in combination with any one or more of the examples of the third embodiment discussed above.

Further embodiments may be provided by any combination of the first embodiment, second embodiment and/or third embodiment either alone or in combination with any one or more of the examples of the corresponding embodiments in the combination.

BRIEF DESCRIPTION OF THE DRAWINGS

The above and other features, aspects and advantages are better understood when the following detailed description of the disclosure is read with reference to the accompanying drawings, in which.

DETAILED DESCRIPTION

Figure 1:
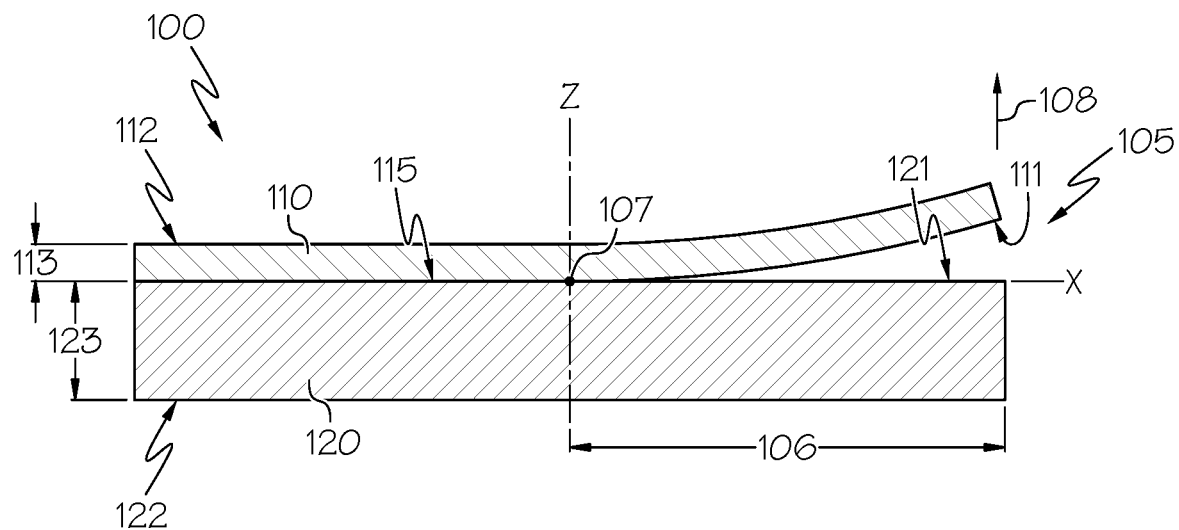
FIG. 1 shows an example initial step of debonding a first substrate from a second substrate by initiating an opening at an interface between the first substrate and the second substrate.

Exemplary embodiments will now be described more fully hereinafter with reference to the accompanying drawings. Whenever possible, the same reference numerals are used throughout the drawings to refer to the same or like parts. However, subject matter encompassed by the claims may be embodied in many different forms and should not be construed as limited to the embodiments set forth herein.

Directional terms as used herein (e.g., up, down, right left, front, back, top, bottom) are made only with reference to the figures as drawn and are not intended to imply absolute orientation.

Embodiments can be used to facilitate removal of a first substrate bonded to a second substrate. For instance, some embodiments can facilitate initial, partial or even complete separation of a first substrate (e.g., a glass substrate) from a second substrate (e.g., a carrier substrate).

In just some embodiments, the first substrate of the disclosure can comprise a flexible glass substrate although the first substrate of the present disclosure can comprise other types of substrates. Flexible glass substrates are often used to manufacture liquid crystal displays (LCDs), electrophoretic displays (EPD), organic light emitting diode displays (OLEDs), plasma display panels (PDPs), touch sensors, photovoltaics, etc. To enable the handling of flexible glass substrates during processing, a flexible glass substrate may be bonded to a relatively rigid second substrate, for example with a bonding agent (e.g., a polymer bonding agent, or bonding agents as discussed in WO2014/093775, WO2014/093193, WO2015/113020, WO2015/113023, WO2015/112958, WO2015/157202, U.S. 62/185,095, or U.S. 62/201,245).

In some embodiments, the second substrate and the first substrate bonded to the second substrate can each include a thickness defined between the respective major surfaces of the substrates. The second substrate can optionally introduce a desired level of rigidity by providing the second substrate with a thickness that is greater than the thickness of the first substrate that is removably bonded to the second substrate. In addition or alternatively, in some embodiments, the second substrate can be selected with a thickness wherein the overall thickness of the second substrate and the first substrate bonded to the second substrate is within a range that can be used with existing processing machinery configured to process relatively thick glass substrates having a thickness within the range of the overall thickness of the second substrate and the first substrate bonded to the second substrate. In such instances, the second substrate may be thinner than the first substrate, yet still provide the desired thickness and/or rigidity to the combined article for processing.

The rigid characteristics and size of the second substrate allow the bonded first substrate to be handled in production without significant bending that may otherwise cause damage to the first substrate (e.g., flexible glass substrate and/or functional components mounted to the flexible glass substrate). After processing (e.g., handling, adding components, treating, etc.), some embodiments may be used to initially or completely remove the second substrate from the first substrate (e.g., glass substrate or silicon wafer), or to remove the first substrate(s) from the second substrate.

As shown in FIG. 1, a composite substrate 100 can include a first substrate 110, for example a glass substrate (e.g., a thin, flexible glass substrate), a silicon wafer or other relatively thin substrate. The first substrate 110 may be formed of any suitable material including glass, glass-ceramic or ceramic, as examples, and may or may not be transparent. When made of glass, the first substrate 110 may be of any suitable composition, including alumino-silicate, boro-silicate, alumino-boro-silicate, soda-lime-silicate, and may be either alkali containing or alkali free depending upon its ultimate application.

The first substrate 110 includes a first major surface 111 parallel to a second major surface 112. The first major surface 111 of the first substrate 110 may be bonded to a first major surface 121 of a second substrate 120. Moreover, the second major surface 112 of the first substrate 110 may optionally be thin film coated depending on at least one of an intended application and process condition.

The first major surface 111 and the second major surface 112 of the first substrate 110 are separated from each other by an average thickness 113. In one embodiment, the average thickness 113 of the first substrate 110 can be less than or equal to about 300 μm (e.g., "ultra-thin"), for example from about from about 40 μm to about 300 μm, for example from about 40 μm to about 280 μm, for example from about 40 μm to about 260 μm, for example from about 40 μm to about 240 μm, for example from about 40 μm to about 220 μm, for example from about 40 μm to about 200 μm, for example from about 40 μm to about 180 μm, for example from about 40 μm to about 160 μm, for example from about 40 μm to about 140 μm, for example from about 40 μm to about 120 μm, for example from about 40 μm to about 100 μm, for example from about 40 μm to about 80 μm, for example from about 40 μm to about 60 μm, for example from about 60 μm to about 300 μm, for example from about 80 μm to about 300 μm, for example from about 90 μm to about 300 μm, for example from about 100 μm to about 300 μm, for example from about 110 μm to about 300 μm, for example from about 120 μm to about 300 μm, for example from about 130 μm to about 300 μm, for example from about 140 μm to about 300 μm, for example from about 150 μm to about 300 μm, for example from about 160 μm to about 300 μm, for example from about 170 μm to about 300 μm, for example from about 180 μm to about 300 μm, for example from about 190 μm to about 300 μm, for example from about 200 μm to about 300 μm, for example from about 210 μm to about 300 μm, for example from about 220 μm to about 300 μm, for example from about 230 μm to about 300 μm, for example from about 240 μm to about 300 μm, for example from about 250 μm to about 300 μm, for example from about 260 μm to about 300 μm, for example from about 270 μm to about 300 μm, for example from about 280 μm to about 300 μm, for example from about 290 μm to about 300 μm, for example from about 50 μm to about 300 μm, for example from about 60 μm to about 290 μm, for example from about 70 μm to about 280 μm, for example from about 80 μm to about 270 μm, for example from about 90 μm to about 260 μm, for example from about 100 μm to about 250 μm, for example from about 110 μm to about 240 μm, for example from about 120 μm to about 230 μm, for example from about 130 μm to about 220 μm, for example from about 140 μm to about 210 μm, for example from about 150 μm to about 200 μm, for example from about 160 μm to about 190 μm, for example from about 170 μm to about 180 μm, and all subranges of average thicknesses therebetween.

As further shown in FIG. 1, the composite substrate 100 may include the second substrate 120, for example a glass substrate, that may be of any suitable material including glass, glass-ceramic, ceramic and composites of organic and inorganic materials, and may or may not be transparent. If made of glass, the second substrate 120 may be of any suitable composition including alumino-silicate, boro-silicate, alumino-boro-silicate, soda-lime-silicate, and may be either alkali containing or alkali-free depending upon its ultimate application. In some embodiments, the second substrate may be formed from a material (e.g., the materials mentioned above) capable of withstanding a high temperature processing technique where the temperature of the first substrate and the second substrate may reach a temperature of at least about 150° C., for example from about 150° C. to about 900° C., for example from about 150° C. to about 700° C., for example from about 150° C. to about 600° C., and all subranges therebetween. The second substrate 120 may be made of one layer or multiple layers (including multiple thin sheets) that are bonded together to form a part of the composite substrate 100. The second substrate 120 may be a same or similar size and/or shape or of a different size and/or shape as the first substrate 110.

The second substrate 120 includes a second major surface 122 parallel to the first major surface 121. The first major surface 121 and the second major surface 122 of the second substrate 120 are separated from each other by an average thickness 123. In some embodiments, the average thickness 123 can be greater than the thickness of the first substrate 110. Providing a relatively thicker second substrate can help increase the effective stiffness and thickness of the composite substrate 100 to allow the first substrate to be processed with machinery designed to process substrates having a relatively greater thickness and/or a relatively greater stiffness than those possessed by the first substrate 110. In some embodiments, the second substrate 120 has a higher rigidity than the first substrate 110.

In some embodiments, the average thickness 123 of the second substrate 120 can be from about 200 μm to about 700 μm, for example from about 250 μm to about 700 μm, for example from about 300 μm to about 700 μm, for example from about 350 μm to about 700 μm, for example from about 400 μm to about 700 μm, for example from about 450 μm to about 700 μm, for example from about 500 μm to about 700 μm, for example from about 550 μm to about 700 μm, for example from about 600 μm to about 700 μm, for example from about 650 μm to about 700 μm, and all subranges of average thicknesses therebetween.

In further embodiments, the average thickness 123 of the second substrate 120 can be from about 200 μm to about 650 μm, for example from about 200 μm to about 600 μm, for example from about 200 μm to about 550 μm, for example from about 200 μm to about 500 μm, for example from about 200 μm to about 450 μm, for example from about 200 μm to about 400 μm, for example from about 200 μm to about 350 μm, for example from about 2000 μm to about 3000 μm, for example from about 200 μm to about 250 μm, and all subranges of average thicknesses therebetween.

In still further embodiments, the average thickness 123 of the second substrate 120 can be from about 250 μm to about 600 μm, for example from about 300 μm to about 550 μm, for example from about 350 μm to about 500 μm, for example from about 400 μm to about 450 μm, and all subranges of average thicknesses therebetween.

The composite substrate 100 can be designed to operate with devices and apparatus based on existing or future infrastructure utilized with respect to manufacturing processes. The first substrate 110 may be bonded to the second substrate 120 at an interface 115. For example, the first major surface 111 of the first substrate 110 can be bonded to the first major surface 121 of the second substrate 120 at the interface 115. The bond between the first substrate 110 and the second substrate 120 can be based at least in part on at least one of wafer bonding, a bonding agent (e.g., a benign bonding agent that temporarily bonds the substrates together for processing yet allows them to be released from one another after processing), and a thermal annealing cycle. The bond between the first substrate 110 and the second substrate 120 can therefore be based at least in part on a chemical bond at the interface 115.

To achieve a desired bond strength between the first substrate 110 and the second substrate 120, a bonding material may be heated, cooled, dried, mixed with other materials, or reaction induced, and pressure may be applied to the first substrate 110 and the second substrate 120. As used herein, "bond strength" refers to any one or more of dynamic shear strength, dynamic peel strength, static shear strength, static peel strength and combinations thereof. Peel strength, for example, is the force per unit width necessary to initiate failure (e.g., static) and/or to maintain a specified rate of failure (e.g., dynamic) by means of a stress applied to one or both of the first substrate 110 and second substrate 120 in a peeling mode. Shear strength is the force per unit width necessary to initiate failure (e.g., static) and/or maintain a specified rate of failure (e.g., dynamic) by means of a stress applied to one or both of the first substrate 110 and second substrate 120 in a shear mode. Any suitable methods can be used to determine bond strength including any suitable peel and/or shear strength tests. For example, the energy of adhesion (i.e., bond energy or bond strength) between two surfaces can be measured by a double cantilever beam method or wedge test. The tests simulate in a qualitative manner the forces and effects on an adhesive bond joint at a modification layer/first sheet interface. Wedge tests are commonly used for measuring bonding energy. For example, ASTM D5041, Standard Test Method for Fracture Strength in Cleavage of Adhesives in Bonded Joints, and ASTM D3762, Standard Test Method for Adhesive-Bonded Surface Durability of Aluminum, are standard test methods for measuring bonding of substrates with a wedge. Also, for example, one method of measuring bond strength is set forth in U.S. 62/201,245, filed on Aug. 5, 2015.

The first substrate 110, in the form of a glass substrate, can be used in a variety of applications including but not limited to display and touch applications. In addition, the first substrate 110 can be flexible and conformable and can withstand high temperatures, along with the second substrate 120. For example, the first substrate and the second substrate can be heated at a temperature of at least about 150° C. during processing of the first substrate 110, for example a temperature from about 150° C. to about 900° C., for example from about 150° C. to about 700° C., for example from about 150° C. to about 600° C., and all subranges therebetween. In some embodiments where the first substrate 110 comprises a glass substrate and the glass substrate, along with the second substrate, are heated at a temperature of at least about 150° C. during a processing technique for example adding functional components to the glass substrate. In further embodiments, the temperature of at least about 150° C. is from about 150° C. to about 700° C., for example from about 400° C. to about 700° C., for example from about 550° C. to about 650° C., and all subranges therebetween. To provide a manner in which to handle and support the first substrate 110, the first substrate 110 can be bonded to the second substrate 120 which may be thicker and/or provide a higher rigidity to the first substrate 110 than the first substrate 110 possesses alone. Once processing is complete, the first substrate 110 can be debonded from the second substrate 120.

Exemplary methods of debonding the first substrate 110 from the second substrate 120 include initiating an opening 105 at the interface 115 between the first substrate 110 and the second substrate 120. The opening 105 can be initiated by applying a force 108 (e.g., a debond force) in a direction opposing the bond between the first substrate 110 and the second substrate 120 at the interface 115. In addition or alternatively, a razor blade or at least one of a sharp, thin, and flat object can be used to initiate the opening 105 by inserting an edge of the razor blade or the at least one of a sharp, thin, and flat object at the interface 115 between the first major surface 111 of the first substrate 110 and the first major surface 121 of the second substrate 120. When the opening 105 is initiated, a debonding front 107 is formed. In some embodiments, an effective crack tip length 106 may develop that, for purposes of the disclosure, is defined as the distance between the debonding front 107 and the force 108 as shown in FIGS. 1 and 4-7.

Throughout the disclosure, the debonding front 107 means a periphery of the interface 115 where, on one side of the periphery of interface 115, the first substrate 110 and the second substrate 120 are bonded together; and, on another side of the periphery of the interface 115, the first substrate 110 and the second substrate 120 are debonded from one another. As shown in the top view of FIG. 7, the debonding front 107 extends with a curved profile, for example the illustrated curved shape that can be curvilinear (e.g., concave) in the direction of propagation 130 of the debonding front 107. As discussed below, the curvilinear shape of the debonding front 107 can reduce stress on the edges of the first substrate (e.g., glass substrate), thereby reducing the likelihood of failure of the first substrate due to imperfections at the edges that may result in the edges being relatively fragile when compared to the corresponding interior portion of the first substrate. Although the debonding front 107 is illustrated with a concave shape, other curvilinear shapes may be provided. In addition or in the alternative, the debonding front 107 can be at least partially or entirely straight, rectilinear (e.g., stepped) or another suitable shape.

It is to be understood that and with continued reference to FIGS. 1 and 4-7, in some embodiments, the interface 115 between the first substrate 110 and the second substrate 120 may be less than a few nanometers in scale such that the physical behavior and characteristics of the first substrate 110 and the second substrate 120 at or near the debonding front 107 are based at least in part on a theoretical or hypothetical understanding of the nature of bonding between the first substrate 110 and the second substrate 120. Such theoretical or hypothetical understanding of the nature of bonding between the first substrate 110 and the second substrate 120 may or may not be identical to actual physical behavior and characteristics of the first substrate 110 and the second substrate 120 at or near the debonding front 107. Moreover, due to the relatively small thickness of the interface 115, debonding characteristics that can be perceived by, for example, a human eye, at the debonding front 107 may differ from that which actually occurs at the debonding front 107 when debonding of the first substrate 110 from the second substrate 120.

Figure 2:
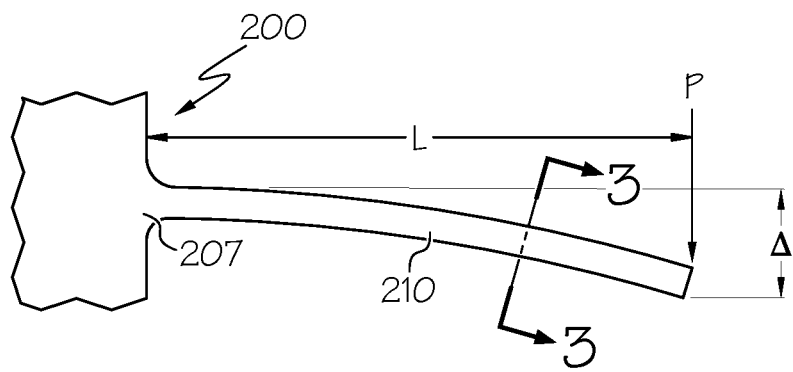
FIG. 2 shows a schematic illustration of a cantilever beam.
Figure 3:
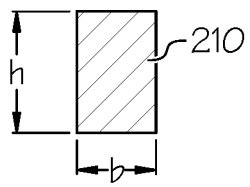
FIG. 3 is a sectional view of the cantilever beam along line 3-3 of FIG. 2.

Turning to FIG. 2, a schematic 200 of a cantilevered beam 210 subjected to an applied end load P is provided to illustrate an approximation of stress produced in the first substrate 110 at the debonding front 107 (e.g., corresponding approximately to location 207 of the cantilevered beam 210) during a debonding process. The first substrate 110 can be pristine and defect free. In some embodiments, however, due to the thin nature of the first substrate 110, the first substrate 110 may be susceptible to high bending stresses. High bending stresses may arise during one or more processes to which the composite substrate 100 may be subjected, including the process of debonding the first substrate 110 from the second substrate 120. For example, the stress (a) produced in the cantilevered beam 210 at location 207 can be approximated using the following equations, where P represents the applied end load, L represents the span of the cantilevered beam 210, b represents the width of the cantilevered beam 210 (see FIG. 3), and h represents the height of the cantilevered beam 210 (see FIG. 3):

$$\sigma = \frac{PL}{Z} \quad (1)$$

$$\Delta = \frac{PL^3}{3EI} \quad (2)$$

$$I = \frac{bh^3}{12} \quad (3)$$

$$Z = \frac{bh^2}{6} \quad (4)$$

$$\sigma = \frac{6P}{b} \times \frac{L}{h^2} \quad (5)$$

The above approximation of the stress ($\sigma$) at location 207 of the cantilevered beam 210 indicates that the bending stress ($\sigma$) at location 207 increases when the span L increases and increases at a higher rate when the height h decreases. Moreover, as the span L increases, an initial mode (e.g., mode I) of debonding or delamination (e.g., pure lift off of the first substrate 110 from the second substrate 120) shifts to both mode I and shear (e.g., mode II). Thus, to propagate the debonding front 107, the applied load P can be increased. In addition, because the stress at the debonding front 107 will counter the direction of the applied load P, it is possible that propagation of the debonding front 107 may be arrested. Such a scenario leads to a monotonic increase of the bending stress ($\sigma$) in the first substrate 110 and an increase in tensile stress at the debonding front 107. The bending stress ($\sigma$) can interact with flaws or other imperfections present in the first substrate 110 (e.g., along edges of the first substrate 110) and can cause failure of the first substrate 110 (e.g., cracking, breaking, fracture, or catastrophic failure). Accordingly, the methods and apparatus of the present disclosure can debond the first substrate 110 from the second substrate 120 while keeping the bending stress ($\sigma$) below a level (e.g., critical level or critical limit) that would otherwise cause failure of the first substrate 110. The critical level can be based at least in part on at least one of flaws or imperfections present in the first substrate 110, the thickness of the first substrate 110 (e.g., defined by average thickness 113), a quality of the first substrate 110 including a quality of edges of the first substrate 110 and a quality of cutting of edges of the first substrate 110.

Figure 4:
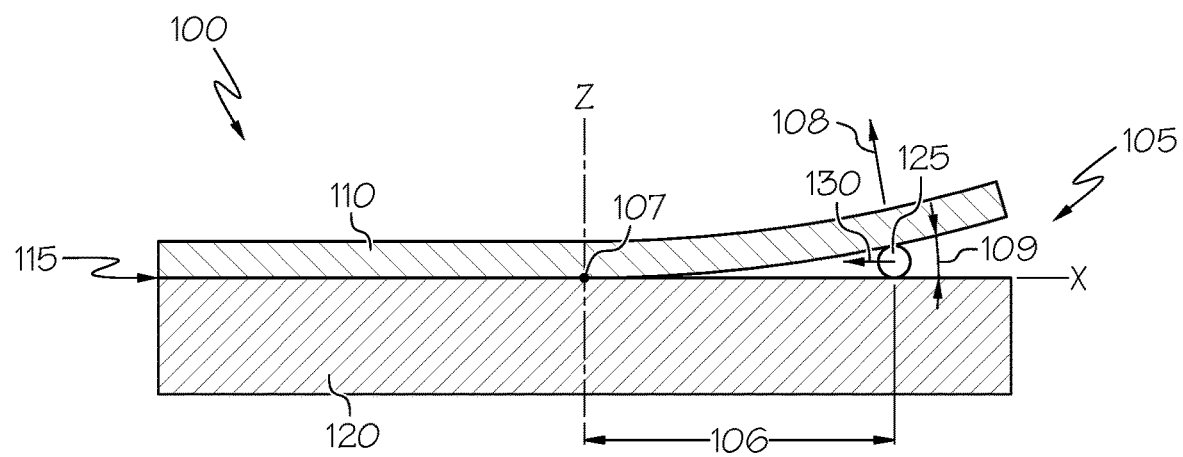
FIG. 4 shows an example schematic cross sectional view of a first substrate being debonded from a second substrate with a wire in accordance with aspects of the disclosure.
Figure 5:
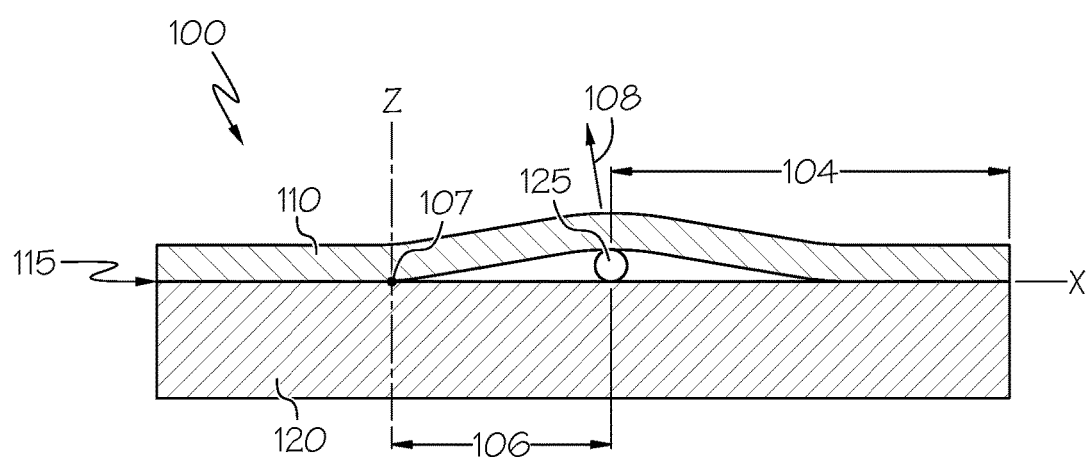
FIG. 5 shows another example schematic cross sectional view of a first substrate being debonded from a second substrate with a wire in accordance with aspects of the disclosure.
Figure 6:
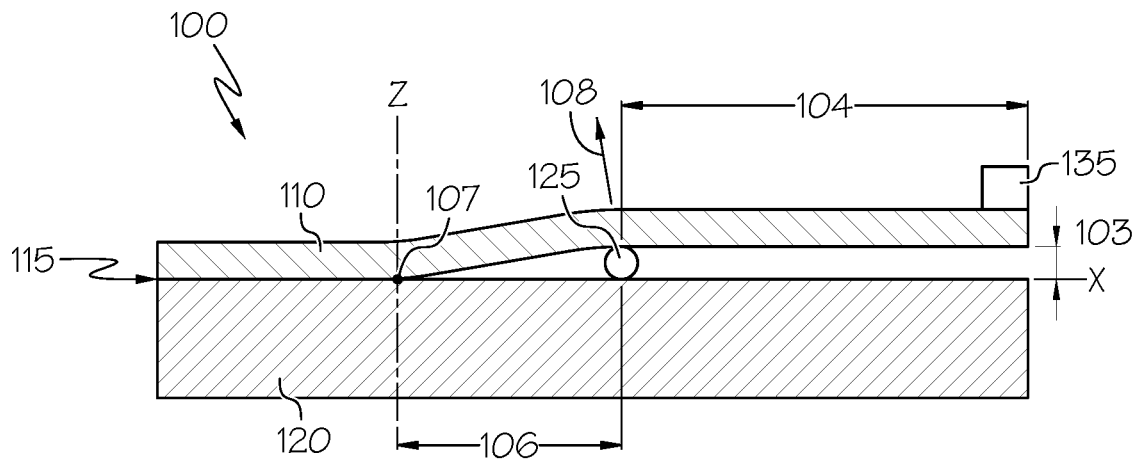
FIG. 6 shows yet another example schematic cross sectional view of a first substrate being debonded from a second substrate with a wire in accordance with aspects of the disclosure.

As shown in FIG. 4, a method and apparatus of debonding the first substrate 110 from the second substrate 120 can include inserting a wire 125 into the opening 105. The method further includes moving the wire 125 along the interface 115 (e.g., along a direction of propagation 130 of the debonding front 107) to propagate the debonding front 107 and debond the first substrate 110 from the second substrate 120 as shown in FIGS. 5 and 6. It is to be understood that any movement of the wire 125 is contemplated herein and is considered to be within the scope of disclosure, including but not limited to movement (e.g., at least one of translation and rotation) along any one or more directions (e.g., X, Y, Z) either alone or in combination. Moreover, the wire 125 may be pulled manually (e.g., by hand) or automatically (e.g., by machine, device, or apparatus) in any one or more longitudinal, lateral, or planar direction along the interface 115 between the first substrate 110 and the second substrate 120. The wire 125 (e.g., movement of the wire) breaks the bond at the interface 115 between the first substrate 110 and the second substrate by imparting a force 108 that separates the first substrate 110 from the second substrate 120. In other embodiments, external assistance (e.g., UV radiation, thermal energy, sonic energy, air pressure) may also be used to reduce or weaken the bond strength at the interface 115 between the first substrate 110 and the second substrate 120.

In some embodiments, the wire 125 can include a diameter from about 50 µm to 300 µm, for example from about 50 µm to about 250 µm, for example from about 50 µm to about 200 µm, for example from about 50 µm to about 150 µm, for example from about 50 µm to about 100 µm, for example from about 100 µm to about 300 µm, for example from about 150 µm to about 300 µm, for example from about 200 µm to about 300 µm, for example from about 250 µm to about 300 µm, for example from about 75 µm to about 300 µm, for example from about 100 µm to about 250 µm, for example from about 150 µm to about 200 µm, and all subranges of average thicknesses therebetween.

In another embodiment, the wire 125 can be a pliable wire including resilient polymers. In some examples, the pliable wire can include resilient polymers selected from at least one of polytetrafluoroethylene (PTFE), nylon, and fluorocarbon. In other examples, the wire may include other materials, for example, metal, cotton, wool, glass, or rubber. The term wire, as used herein, is meant to encompass other similar structures, for example, cable, chain, cord, fiber, filament, rod, rope, strand, thread, yarn, multi- or mono element members as well as braided or otherwise stranded members made of the foregoing. In some examples, the wire (or components thereof) may have a core and cladding type of structure wherein each of these parts is made of the same or of a different material.

In some embodiments, the wire 125 can include a tensile strength within a range of about 25 MPa to 10 GPa. In addition or alternatively, the wire 125 can optionally include a tensile strength less than a critical failure stress of the first substrate 110. For purposes of this disclosure, the critical failure stress of the first substrate can be determined by the four point bend test. During the four point bend test, the first substrate is loaded along two parallel top inner rollers while the first substrate is being supported along two parallel outer rollers. The critical failure stress is the stress that the first substrate fails under the four point bend test. In some embodiments, the critical failure stress of the first substrate 110 (e.g., glass substrate) can be greater than 25 MPa and even greater than 10 GPa.

Providing the wire 125 with a tensile strength that is less than the critical failure stress of the first substrate 110 allows the wire fail prior to inducing failure of the first substrate, thereby protecting the first substrate from being critically damaged by stresses produced by the wire. Furthermore, the wire used during debonding is relatively inexpensive to replace. Thus, even if the wire 125 fails (e.g., at least one of yields and fails), the method can further include inserting a new wire between the first substrate 110 and the second substrate 120, and moving the new wire along the interface 115 to further propagate the debonding front 107 to continue debonding the first substrate 110 from the second substrate 120. In some embodiments, the new wire can include a second tensile strength greater than the first tensile strength and less than the critical failure stress of the first substrate 110. Thus, the new wire will be less likely to fail than the original wire while still protecting the first substrate from being critically damaged by stresses produced by the new wire.

The effective crack tip length 106 can be relatively small due to the relatively small diameter of the wire 125. As such, bending stress at the debonding front 107 remains relatively low even under the force 108 that breaks the bonds between the first substrate 110 and the second substrate 120. During the step of moving the wire 125, a debond angle 109, defined as an angle between a debonded portion of the first substrate 110 and a corresponding portion of the second substrate 120 measured at an effective crack tip length 106 behind the debonding front 107, can remain about constant. Thus, the bending stress at the debonding front 107 can remain substantially constant during the debonding process. Turning to FIGS. 5 and 6, the wire 125 can be moved to propagate the debonding front 107 and debond the first substrate 110 from the second substrate 120. A debonded portion of the first substrate 110 includes a debonded length 104 that extends behind the wire 125. As shown in FIG. 5, in one embodiment, the debonded length 104 can comprise a sag length wherein a portion of the debonded length of the first substrate 110 may sag and come into contact with the second substrate 120. Subsequent contact between the portion of the debonded length of the first substrate 110 and the second substrate 120 can undesirably result in rebonding between the first substrate and the second substrate. Alternatively, the debonded length 104 can have an overhang length (i.e., a length that does not result in contact between the first substrate and the second substrate). Preventing contact between the first substrate and the second substrate with the overhang length can prevent undesirable rebonding between the first substrate and the second substrate. However, an overhang length that is not supported, as well as a sag length, can result in unwanted pressure to the wire 125 due to the weight of the debonded length being imposed and even leveraged onto the wire 125. Consequently, the unwanted pressure on the wire 125 can increase the tensile stress on the wire 125 as it is being used to debond the first substrate from the second substrate. The unwanted increase in tensile stress on the wire 125 may result in unfortunate failure of the wire 125 during the debonding process.

To reduce pressure on the wire, FIG. 6 illustrates an embodiment where the method can optionally include the step of providing the debonded length 104 as an overhang length while supporting the overhang length to maintain a minimum separation distance 103 between a debonded portion of the first substrate 110 and a corresponding portion of the second substrate 120. Supporting the overhang length can reduce, for example eliminate, additional pressure on the wire 125. Consequently, as pressure on the wire is reduced, the additional tensile stress that would have been imposed on the wire due to the unsupported overhang length can be reduced or eliminated. In some embodiments, the minimum separation distance 103 is greater than or equal to a diameter of the wire 125 to reduce, for example eliminate, pressure on the wire that may result from leveraged pinching of the wire between the first substrate and the second substrate. To even further reduce, for example eliminate, pressure on the wire, the minimum separation distance 103 is maintained over the entire overhang length. Indeed, as shown in FIG. 6, the minimum separation distance 103 is maintained over the entire overhang length between the wire 125 and the outermost debonded edge of the first substrate 110 trailing behind the debonding front 107. Supporting the overhang length can be achieved by applying a force having a force component opposite the direction of gravity. Supporting the overhang length to maintain the minimum separation distance 103 can be performed in a wide variety of ways. For example, one or more suction cups 135 may be used to support the debonded length 104. In further embodiments, noncontact support devices (e.g., Bernoulli air chucks, etc.) may be used to support the debonded length 104. Providing noncontact support can be beneficial to avoid damaging a pristine surface of the first substrate.

Figure 7:
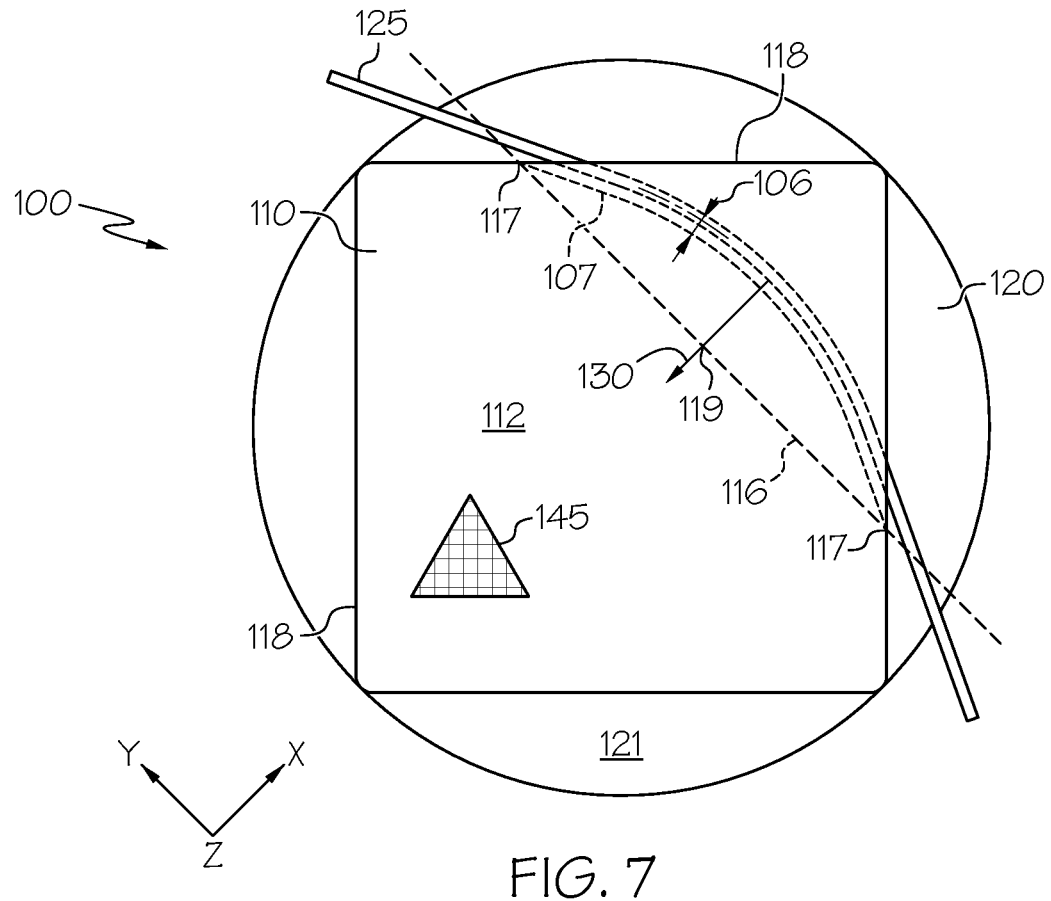
FIG. 7 shows a schematic view of a first substrate being debonded from a second substrate with a wire in accordance with aspects of the disclosure.

A top view of the composite substrate 100 is shown in FIG. 7. Prior to the step of moving the wire 125, the first substrate 110 and the second substrate 120 may undergo one or more high temperature processes (e.g., anneal at about 150° C. as well as other processes including temperatures within a range of about 150° C. to about 700° C., 250° C. to about 600° C. or even greater than 700° C.) that increase a bond strength between the first substrate 110 and the second substrate 120. In some embodiments, the bond strength can be as high as 800 mJ/m$^2$, 1000 mJ/m$^2$, or higher. In one embodiment, prior to the step of moving the wire 125, functional components 145 (schematically illustrated in FIG. 7) can be applied to the second major surface 112 of the first substrate 110. The functional components 145 can include thin film transistors (TFTs), photovoltaic (PV) devices, organic light emitting diodes (OLEDs), and liquid crystal display (LCD). In another embodiment, the method further includes the step of performing the step of moving the wire 125 until the first substrate 110 is entirely debonded from the second substrate 120 such that the first substrate 110 and the functional components 145 applied to the first substrate 110 can be separated from the second substrate 120.

As shown in FIG. 7, the wire 125 is configured to conform to a shape of the debonding front 107 during the step of moving the wire 125 such that one or more edges 118 of the first substrate 110 (e.g., identified at locations 117) are debonded from the second substrate 120 prior to a debonding of a corresponding interior portion (e.g., identified at location 119) of the first substrate 110 from the second substrate 120. For purposes of this application, the interior portion is considered to be a portion that includes a location 119 along an imaginary line 116 connecting the two locations 117 where the edges are debonded at the debonding front 107. As shown, the interior portion can also be considered to include the portion of the illustrated location 119 that is the midpoint of the imaginary line connecting the two locations 117. Debonding of the two locations 117 prior to the corresponding interior portion can reduce stresses imposed on the edges of the first substrate that may be particularly vulnerable to edge failure due to edge imperfections. To achieve debonding at the locations 117 prior to the corresponding interior portion, the shape of the debonding front 107 can be concave with respect to the direction of propagation 130 of the debonding front 107. Furthermore, due to the nature of the conformity of the wire 125 to a shape of the debonding front 107, the debonding of the first substrate 110 from the second substrate 120 is maintained predominately as mode I (described above). Mode I has a lower debond or delamination energy than, for example, mode II. Therefore, the wire 125 and the debonding front 107 tend to move or conform to a shape or profile that maximizes mode I and minimizes mode II (e.g., minimizes adverse stresses in the first substrate 110) during the debonding process.

Moreover, in the event of interaction of the wire 125 with any sharp transitions, flaws, or imperfections of the first substrate 110 (e.g., along one or more edges 118 of the first substrate 110) or interaction with locations at the interface 115 of higher or stubborn bonding strength between the first substrate 110 and the second substrate 120, the wire 125 is configured to at least one of yield and fail prior to a failure of the first substrate 110 to prevent any damage to the first substrate 110 and the second substrate 120. The wire 125, therefore, relieves or redistributes stress in the first substrate 110 that would otherwise occur if not for the pliable nature of the wire 125. As noted, if the wire 125 at least one of yields and fails, the debonding process can be continued or repeated one or more times using a new wire 125 having at least one of an incrementally higher tensile strength and an incrementally larger diameter.

Many variations and modifications may be made to the above-described embodiments without departing substantially from the spirit and various principles described herein. All such modifications and variations are intended to be included herein within the scope of this disclosure and the following claims. Thus, it will be apparent to those skilled in the art that various modifications and variations can be made without departing from the spirit and scope of the following claims.

The invention claimed is:

1. A method of processing a first substrate bonded to a second substrate comprising the steps of:
   initiating an opening at an interface between the first substrate and the second substrate;
   inserting a wire into the opening;
   moving the wire along the interface to propagate a debonding front and debond the first substrate from the second substrate; and
   continuing to propagate the debonding front while maintaining at least a minimum separation distance between the first substrate and the second substrate over an entire debonded length between the debonding front and an outermost debonded edge of the first substrate by applying a force to an overhang length of the debonded length, wherein the force comprises a force component opposite a direction of gravity to support the overhang length of the first substrate to reduce stress on the wire, and wherein the wire comprises a first tensile strength less than a critical failure stress of the first substrate.

2. The method of claim 1, wherein the first substrate comprises a thickness less than or equal to about 300 µm.

3. The method of claim 1, wherein the wire comprises a diameter from about 50 µm to about 300 µm.

4. The method of claim 1, wherein the wire comprises a tensile strength from about 25 MPa to about 10 GPa.

5. The method of claim 1, wherein the wire is pliable.

6. The method of claim 5, wherein the wire comprises one or more of polytetrafluoroethylene (PTFE), nylon, or fluorocarbon.

7. The method of claim 1, wherein the minimum separation distance is greater than or equal to a diameter of the wire.

8. The method of claim 1, further comprising:
   removing the wire;
   inserting a new wire between the first substrate and the second substrate; and
   moving the new wire along the interface to further propagate the debonding front and further debond the first substrate from the second substrate, wherein the new wire comprises a second tensile strength greater than the first tensile strength and less than the critical failure stress of the first substrate.

9. The method of claim 1, wherein a device selected from the group consisting of suction cups and Bernoulli air chucks is used to apply the force to the overhang length.

10. A method of processing a first substrate bonded to a second substrate comprising the steps of:
    moving a wire along an interface between the first substrate and the second substrate to propagate a debonding front and debond the first substrate from the second substrate; and
    continuing to propagate the debonding front while maintaining at least a minimum separation distance between the first substrate and the second substrate over an entire debonded length between the debonding front and an outermost debonded edge of the first substrate by applying a force to an overhang length of the debonded length, wherein the force comprises a force component opposite a direction of gravity to support the overhang length of the first substrate to reduce stress on the wire, wherein the first substrate comprises a thickness of less than or equal to about 300 µm, and wherein the wire comprises a tensile strength less than a critical failure stress of the first substrate.

11. The method of claim 1, further comprising maintaining a debond angle substantially constant during the step of moving the wire.

12. The method of claim 1, wherein prior to the step of moving the wire, increasing a bond strength between the first substrate and the second substrate by raising the temperature of the first substrate and the second substrate to a temperature of at least about 150° C.

13. The method of claim 1, wherein prior to the step of moving the wire, applying functional components to a major surface of the first substrate facing away from the second substrate bonded to the first substrate.

14. The method of claim 1, wherein the step of continuing to propagate the debonding front entirely debonds the first substrate from the second substrate.

15. The method of claim 1, wherein the wire is configured to conform to a shape of the debonding front during the step of moving the wire such that one or more edges of the first substrate are debonded from the second substrate prior to a debonding of a corresponding interior portion of the first substrate from the second substrate.

16. The method of claim 15, wherein the shape of the debonding front is concave with respect to a direction of propagation of the debonding front.

17. The method of claim 15, wherein a bond strength at the debonding front is defined based, at least in part, on one or more of a wafer bonding between the first substrate and the second substrate, or a bonding agent between the first substrate and the second substrate.

18. The method of claim 10, wherein the wire comprises a diameter from about 50 µm to about 300 µm.

19. The method of claim 10, wherein the minimum separation distance is greater than or equal to a diameter of the wire.

20. The method of claim 10, wherein a device selected from a group consisting of suction cups and Bernoulli air chucks is used to apply the force to the overhang length.

21. The method of claim 10, wherein the wire comprises one or more of polytetrafluoroethylene (PTFE), nylon, or fluorocarbon.

22. The method of claim 10, further comprising:
    removing the wire;
    inserting a new wire between the first substrate and the second substrate; and
    moving the new wire along the interface to further propagate the debonding front and further debond the first substrate from the second substrate, wherein the new wire comprises a second tensile strength greater than the first tensile strength and less than the critical failure stress of the first substrate.

\* \* \* \* \*